United States Patent [19]
Anderson

[11] 3,750,592
[45] Aug. 7, 1973

[54] LOCK MECHANISM EMPLOYING BALLOON VALVES FOR VACUUMIZED TUBE TRANSPORTATION SYSTEM

[75] Inventor: Byron C. Anderson, El Cajon, Calif.
[73] Assignee: Rohr Industries, Inc., Chula Vista, Calif.
[22] Filed: May 21, 1971
[21] Appl. No.: 145,742

[52] U.S. Cl.................. 104/138, 137/613, 243/21, 243/38
[51] Int. Cl....................... B61b 13/10, B65g 51/04
[58] Field of Search.................... 104/138, 155, 156; 243/21, 38; 251/61.1; 137/613, 525.3

[56] References Cited
UNITED STATES PATENTS

| 3,438,337 | 4/1969 | Edwards.................. 104/138 R X |
| 2,676,609 | 4/1954 | Pfarrer...................... 251/61 X |
| 3,320,750 | 5/1967 | Haise et al............... 251/61.1 X |
| 1,813,625 | 7/1931 | Knox................................ 104/155 |
| 3,192,645 | 7/1965 | Oetjen et al............ 104/138 R X |
| 3,352,512 | 11/1967 | James, Sr..................... 104/155 X |
| 3,580,527 | 5/1971 | Cynober............................ 243/38 |
| 3,605,629 | 9/1971 | Edwards............................ 104/138 |
| 3,610,163 | 10/1971 | Edwards et al................... 104/156 |

FOREIGN PATENTS OR APPLICATIONS

| 1,085,712 | 10/1967 | Great Britain................... 104/155 |

*Primary Examiner*—Robert J. Spar
*Attorney*—George E. Pearson

[57] ABSTRACT

For providing an air lock in a selected portion of a vacuumized tube in which high speed vehicles or trains are operated, a plurality of bulkheads are provided at selected spaced intervals throughout the length of the tube. Each bulkhead has two openings therein to allow vehicles or trains traveling in opposite directions to pass therethrough. A pair of inflatable balloons, which act as valves, are stowed in deflated condition, one adjacent each end of each bulkhead opening, and each balloon is connected by a valve controlled conduit to a supply of pressurized inflating gas, such as compressed air. When released from their stowed position, the balloons on selected sides of a selected pair of bulkheads drop by gravity into alignment with their respective bulkhead openings, where they are quickly inflated. Vent valve means then admits atmospheric air into the lock section of tube thus established between the selected bulkheads, and this air tends to flow through the openings in the selected pair of bulkheads into the vacuumized zones of the tube therebeyond. The air currents thus created urge the inflated balloons into seated condition on valve seats provided on the peripheries of their respective bulkhead openings to thereby seal such openings. Atmospheric air continues to be admitted into the lock section between the sealed off bulkheads until the pressure in such lock section is at atmospheric pressure, or at such lesser pressure as may be desired, at which time the vent valve means may be closed.

10 Claims, 4 Drawing Figures

3,750,592

INVENTOR.
BYRON C. ANDERSON

BY George E. Pearson
ATTORNEY

LOCK MECHANISM EMPLOYING BALLOON VALVES FOR VACUUMIZED TUBE TRANSPORTATION SYSTEM

BACKGROUND OF THE INVENTION

In a new generation of high speed vehicles and trains now under development, an important concept is to support the vehicles magnetically, either by attraction or repulsion, and to accelerate and decelerate the vehicles by a linear induction motor, or L.I.M. In one such proposed development the vehicles are operated in vacummized tube or tunnel, evacuated to an altitude equivalent of 300,000 feet or more. At high speeds, for example, between 300 and 2,000 m.p.h. little resistance to vehicle movement is offered by the slight amount of air remaining in the tube. However, it is necessary under certain conditions to be able to lock off a selected section of the tube, and admit atmospheric air to such lock section.

PURPOSE OF THE INVENTION

A primary objective of the present invention is to lock off and vent to the atmosphere a selected section of a vacummized tube in which high speed vehicles are operated. A further objective of the invention is to provide a plurality of bulkheads at selected intervals throughout the length of a vacummized tube within which high speed vehicles or trains are operated, each bulkhead having at least one opening therein for the passage of vehicles traveling in a selected direction therethrough. A deflated balloon is stored at each bulkhead adjacent at least one end of each opening therein. Each balloon is stowed in quick release means laterally beyond the paths of vehicles passing through the bulkhead openings. When deployed for sealing off a selected bulkhead, the balloons on a selected side of such bulkhead are released and moved into alignment with their respective bulkhead openings, where they are inflated to seat on the peripheries of their respective openings. Any selected section of the tube between any selected two bulkheads therein can thus be locked off. Other valve means are provided to admit atmospheric air into a selected lock section thus formed.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
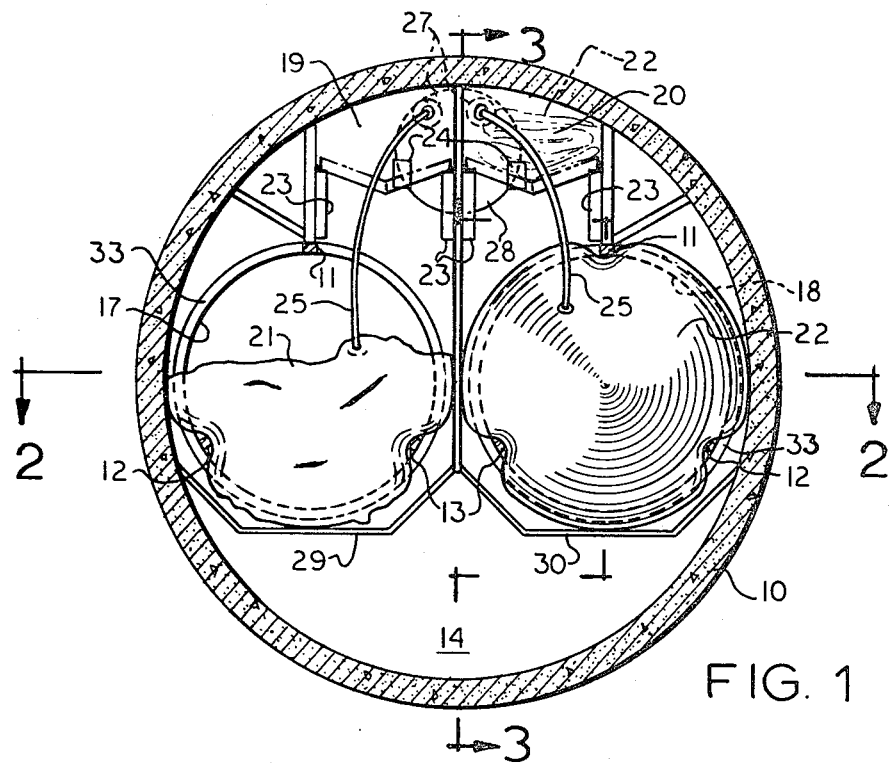
FIG. 1 is a diagrammatic view, in the nature of a transverse vertical section taken along line 1—1 of FIG. 2 through a vacuumized vehicle tube having air lock means embodying the invention installed therein.

Referring to the drawings in detail, a vacuumized tube 10 is designed for installation either elevated, on the surface, underground, or under water. The actual tube structure is not a feature of the present invention, but in a presently preferred form is of steel reinforced concrete with a steel lining hermetically sealed by welding. A presently contemplated tube is of the order of 35 feet internal diameter, and the vehicles, not shown, for operation therein are generally tubular and of approximately 15 feet external diameter. Vehicles, not shown, for operation in the tube 10 are magnetically supported by an overhead rail 11, which also cooperates with mechanism on the vehicles in a known manner to provide a linear induction motor or L.I.M. Two magnetic guide rails 12 and 13 are also provided, one along each side of such vehicle, to prevent vehicle sway, to guide the vehicles around curves, and for use in switching.

A plurality of bulkheads 14 are provided at selected spaced intervals along the length of the tube 10, for example one every ten miles, and as illustrated are of steel reinforced concrete. The bulkhead reinforcing steel, not shown, is tied in a well known manner to the usual reinforcing steel of the tube wall 10, and is sealed to the tube lining, not shown, as by welding, in a manner which will be obvious to an ordinarily skilled welder, designer or engineer. Since the structural details of the tube 10 and bulkheads 14 are not features of the invention, and will be designed and built to the specific requirements and conditions of each installation, such details are omitted.

Figure 2:
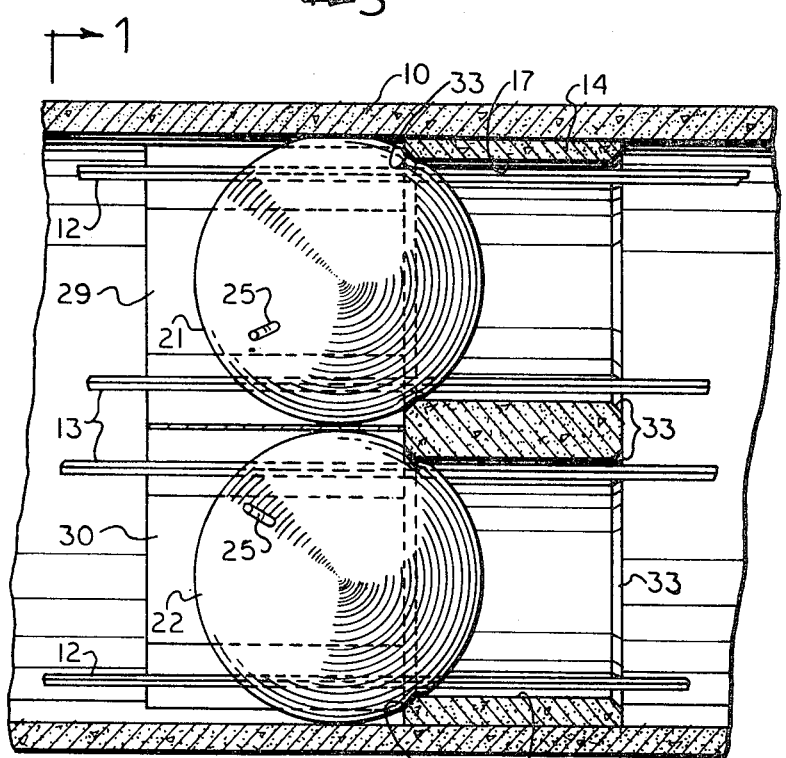
FIG. 2 is a fragmentary, sectional view taken along line 2—2 of FIG. 1.

Each bulkhead 14 has two openings 17 and 18, see FIGS. 1 and 2, therethrough with the rails 11, 12 and 13 mounted as nearly flush as practicable with the bulkhead surfaces defining each of these openings. Except for the openings 17 and 18 therein, each bulkhead comprises a hermetic seal across the tube 10. A pair of balloon stowing cages 19 and 20 are provided, one above each bulkhead opening 17 and 18, and preferably spaced axially of the tube 10 from the bulkhead by a distance of several feet, for example, six feet. Then, when the balloons are released from their respective cages they will be tethered by their inflating hoses and prevented thereby from wholly entering the bulkhead openings during inflation.

A pair of balloons 21 and 22 are stowed in deflated, preferably folded condition within the cages 19 and 20, respectively, and are retained therein by suitable means, such as a pair of trap doors 23 and suitable electrically releasable latches 24. Since such latches are well known and are available commercially, the details thereof are omitted. The balloons 21 and 22 are of generally spherical shape, and are of a diameter somewhat larger than the bulkhead openings they are intended to seal. For example, the openings may be of a diameter of the order of 16 feet, and the balloons of an inflated diameter of the order of 17 feet.

A strong, flexible, compressed air hose 25 connects each balloon through an electrically controlled valve 27 with a tank 28 having a supply of pressurized gas, such as compressed air, therein. Each hose 25 is of sufficiently large internal diameter to provide rapid inflation of its associated balloon, for example, less than 1 second. A pair of trough-like guides 29 and 30 are provided, one below each balloon, to support and guide the balloons into seated position in their respective bulkhead openings.

Figure 4:
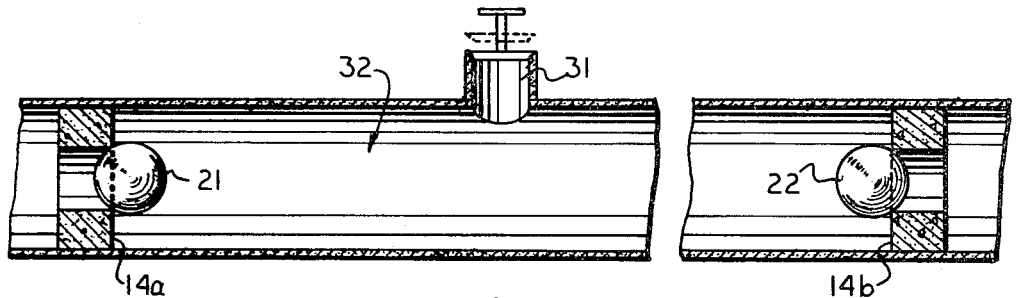
FIG. 4 is a fragmentary, diagrammatic, vertical longitudinal, sectional view in reduced scale showing a lock section of tube, an intermediate portion being broken away.
Figure 3:
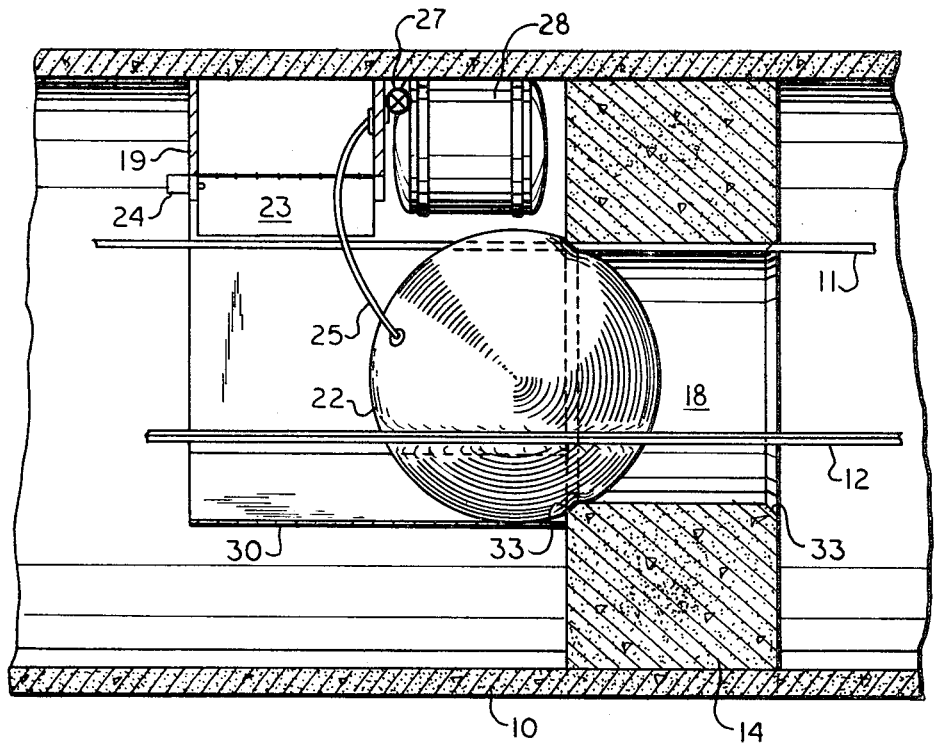
FIG. 3 is a fragmentary, sectional view taken along line 3—3 of FIG. 1.

While balloons 21 and 22 are shown mounted on but one side of the bulkhead 14 in FIG. 3, it will be understood that a second pair of similar balloons are mounted in a similar manner on the other side of each bulkhead 14 in the tube 10. Then, if it is desired to seal off and pressurize a lock section between any two selected bulkheads in the tube 10, for instance, as shown in FIG. 4, the section 32 of tube 10 between the bulkheads 14a and 14b, the balloons on what are to be the high pressure sides of said selected bulkheads may be electrically released from their cages 19 and 21, see FIGS. 1 and 3, and inflated by actuating their respective electrically controlled valves 27.

OPERATION

The transportation system in which the present invention is embodied is intended to be operated by computer, somewhat in the manner of the new Bay Area Rapid Transit System in San Francisco. When pressurization of a selected lock section of the tube 10 is required, such as the lock section 32 of FIG. 4, electrical switch means, not shown, controlling the electrical latch means 24 for the balloon cages 19 and 20 located on the inner or facing sides of the bulkheads 14a and 14b relative to such section are computer actuated. Release of these latches frees the cage doors 23 and allows the selected balloons retained thereby to drop by gravity onto their respective trough shaped guides 29 and 30.

Thereupon the electrically controlled valves 27 are actuated and the balloons are quickly inflated to a required initial, light, seating pressure, for example of the order of 3 – 5 pounds p.s.i. One or more vent valves 31, see FIG. 4, opening into the selected lock section 32 from the atmosphere are then opened to admit atmospheric air. The inrush of atmospheric air into the selected lock section 32 creates air currents outwardly through the openings in the selected bulkheads 14a and 14b, see FIG. 4, which air currents blow the initially lightly inflated balloons onto their respective seats 33. After seating, the balloons are further inflated to required final sealing pressure, for example, 3 atmospheres. The balloons are strongly made, for example, of cord-reinforced rubber or rubber-like material.

There will of course be some leakage where the rails 11, 12 and 13 cross valve seats 33 which are provided around the peripheries of the bulkhead openings 14. These leaks are relatively small, and the large, powerful vacuum pumps, not shown, acting to maintain the tube vacuum beyond the lock section 32 are able to cope with such leakage with but slight loss of vacuum. In the event that a vehicle or train should accidentially be routed into the lock section while the balloon valves are in place in their bulkhead openings, the vehicle or train will destroy the balloons and pass through without other serious damage.

When the lock section 32 is to be returned to service after having been locked off and pressurized, the vent valve 31 and any other vent means which have been opened to pressurize the lock section are closed, and the section 32 is again vacuumized by the vacuum pumps, not shown, provided for this purpose. The balloons 21 and 22 are then deflated as by opening the hoses 25 to the vacuum within the tube 10, and are replaced in their respective cages 19 and 20, where they are retained by their respective trap doors 23 and latch means 24, ready for use when again required.

The invention provides a simple, positive means for creating an air lock section in a selected portion of a vacuumized tube used for the operation of high speed vehicles therein.

Having thus described my invention, what I claim as new and useful and desire to protect by U.S. letters Patent is:

1. Lock mechanism for a transportation system wherein high speed vehicles are operated in a vacuumized tube of larger diameter than the vehicles operated therein, said lock mechanism comprising, a plurality of bulkheads at selected spaced intervals along the length of the tube, each bulkhead having at least one opening therein of smaller diameter than the tube and spaced inwardly therefrom, for the passage of vehicles therethrough, each bulkhead being otherwise impervious and sealed hermetically to the tube.

at least one radially collapsible and expansible valve member stowed in collapsed condition on the side of each of two selected bulkheads facing the other of said selected bulkheads, thereby defining a lock section of the tube between such two selected bulkheads, means for deploying each of such two valve members into alignment with its respective bulkhead opening, means for expanding each selected valve member to a diameter greater than that of its respective bulkhead opening each valve member being of such shape and size when expanded as to seat in and seal its respective bulkhead opening, means tethering each valve member to the tube during its deployment and expansion to prevent the valve member from passing through the opening in its respective bulkhead, and means for introducing air at atmospheric pressure into such defined lock section of tube for pressurizing such lock section and thereby urging such two expanded valve members into seated relation with the bulkhead structure defining their respective bulkhead openings, thereby sealing off such lock section from the remainder of the tube.

2. Lock mechanism for a transportation system wherein high speed vehicles are operated in a vacuumized tube of larger diameter than the vehicles operated therein, said lock mechanism comprising, a plurality of bulkheads at selected spaced intervals along the length of the tube, each bulkhead having at least one opening therein of smaller diameter than the tube for the passage of vehicles therethrough, each bulkhead being otherwise impervious and selaed hermetically to the tube, a least one balloon valve member mounted adjacent a selected side of each such opening in two selected bulkheads of said plurality thereof, each of said at least one balloon valve members being located on the side of its selected bulkhead facing the other selected bulkhead, thereby defining a lock section of the tube between such two selected bulkheads, means for stowing each balloon valve member laterally beyond the path of vehicles passing through such bulkhead openings, means for deploying the balloon valve members on the facing sides of such two selected bulkheads into alignment with their respective bulkhead openings, means for inflating each of said deployed balloon valve members to a diameter greater than that of its respective bulkhead opening each balloon valve member being of a shape and size when inflated as to seat in and seal its respective bulkhead opening, means tethering each valve member to the tube during its inflation to prevent it from passing through the opening in its respective bulkhead, and means for introducing air at atmospheric pressure into the lock section of tube between said two bulkheads for pressurizing such lock section and urging the inflated balloon valve members into seated relation with their respective bulkhead openings, thereby sealing off such lock section from the remainder of the tube.

3. Lock mechanism as claimed in claim 2 wherein a vehicle track comprising at least one vehicle support rail extends through all of the bulkhead openings substantially flush with a portion of each bulkhead defining each such opening therein.

4. Lock mechanism as claimed in claim 3 wherein three vehicle tracks comprising a magnetized upper vehicle support rail and two magnetized lower guide rails extend through all of the bulkhead openings substantially flush with the portion of each bulkhead defining each such opening therein.

5. Lock mechanism as claimed in claim 2 wherein the means for stowing each of said balloon valve members comprises, releasable means retaining each balloon valve member in deflated condition laterally beyond the path of vehicles through such bulkhead openings, and the means for inflating the balloon valve members comprises a hose connected to and openly communicating with each balloon valve member, and control means for communicating selected ones of the hoses to a supply of pressurized gas for inflating the balloon valve members to which said selected hoses are connected.

6. Lock mechanism as claimed in claim 5, wherein each hose is of a length and strength to tether each balloon from movement through the bulkhead opening adjacent which it is mounted.

7. Lock mechanism as claimed in claim 2 wherein the means for introducing air into a lock section of tube between two selected bulkheads comprises valve means controlling at least one opening from the atmosphere into the interior of the tube between each two adjacent bulkheads in the tube.

8. Lock mechanism as claimed in claim 2 wherein two openings and their respective balloon valve members and associated mechanisms are provided in side-by-side relation in each bulkhead.

9. Lock mechanism as claimed in claim 2 wherein valve member guide means is mounted below each stowed valve member, each guide means positioned to receive and support an associated balloon valve member upon deployment thereof for guiding such associated valve member upon inflation thereof into seated relation in its respective bulkhead opening.

10. Lock mechanism as claimed in claim 2 wherein the inflating means operates in two stages, the first stage of inflation comprising inflation of the balloon valve member only to a shape and size to seat in its associated bulkhead opening, and the second stage of inflation comprising inflation of the balloon valve member to a pressure to withstand full atmospheric pressure on the lock side of its associated bulkhead with maximum designed vacuum on the other side of its associated bulkhead.

* * * * *